Patented Nov. 20, 1945

2,389,371

UNITED STATES PATENT OFFICE 2,389,371

PRINTING INKS

John W. Kroeger, Drexel Hill Plaza, and Daniel J. O'Connor, Jr., Yeadon, Pa., assignors to Fred'k H. Levey Co., Inc., New York, N. Y., a corporation of New York No Drawing. Application July 26, 1944, Serial No. 546,738

6 Claims. (Cl. 106—30)

This invention relates to printing inks of the quick drying type, particularly those inks which are dried rapidly by the application of steam to the freshly printed web or sheet affording prints which are rub-proof and which will not offset when rewound or stacked. The invention relates especially to steam-setting inks capable of satisfactorily printing half-tone illustrations.

Steam-setting inks have been described heretofore. Usually such inks consist of pigments suspended in vehicles consisting of a water-insoluble resin dissolved in a liquid polyglycol such as diethylene glycol. The inks are dried by the action of steam which causes water to dissolve in the film, thereby precipitating the water-insoluble resin.

In a co-pending application of Kroeger and O'Connor Serial No. 466,672, filed November 23, 1942, steam-setting inks consisting of pigmented suspensions of water-soluble resins in organic solvents are described. These inks have the advantage over water-insoluble resin systems in that they are not set or dried prematurely even by a relative humidity of 100%, although when the film of ink on paper is subjected to steam, drying takes place in one second or less.

Inks of either of the classes described, that is, including a vehicle comprising either a water-insoluble resin or a water-soluble resin, have certain disadvantages in respect to printing from plates containing fine half-tone screen areas. The prints become progressively more "specked" or "filled in" as the printing operation continues, with the result that the number of satisfactory impressions is low and frequency of wash-ups so great as to make the inks commercially impractical for half-tone printing. Waste of paper and of time are particularly to be avoided in printing operations.

The half-tone screen plate is made up of a large number of small, uniformly spaced dots or projections raised above the surface of the intervening areas of the plate. The flat top surfaces of these projections carry the ink, thus producing when printed an image of the surface of the projections on the paper. A typical plate may have a "120-line" screen, that is, any square inch of the screen area will have 120 dots or projections on a side, or a total of approximately 14,400 projections per square inch.

In any normal printing operation there is a quantity of dust, lint, paper fibres and pigment particles which collect on the plate, and unless removed they will pack into the recesses between the dots until sufficient material is collected to bridge the opening between two or more dots. This bridged-over group of dots then transmits ink to the paper, and the result is a distinct "speck" in an otherwise uniformly printed area of smaller dots. As this process is repeated, the print takes on a typical "dirty," rough appearance which is highly objectionable. The screens normally used in commercial half-tone printing vary from 100 to 133 lines per linear inch. As might be expected, difficulty with "specking" or "fill-up" becomes more pronounced when the finer screens are used.

The older types of printing inks such as those made with linseed oil have the property of continually cleaning the plate of adherent dust, lint, fibers and pigment. These materials are carried back to the ink fountain where they are deposited and held. At the end of a long printing run, a substantial quantity of such materials may be found in the bottom of the fountain. Steam-setting inks made with resins dissolved in liquid polyglycols as solvents have very little tendency to behave in the manner described with respect to oil inks. The lint and dust which collect on the plate are not removed by the ink and remain in the recesses of the screen, eventually causing the difficulties hereinbefore mentioned.

It is the object of the present invention to provide improved inks of the steam-setting type which are not subject to the disadvantages set forth.

Other objects and advantages of the invention will be apparent as it is better understood by reference to the following specification, in which the preferred embodiments of the invention are described.

We have discovered that by incorporating substantial proportions of pine oil or its equivalent in steam-setting inks containing either water-insoluble or water-soluble resins dissolved in liquid polyglycols, a substantial improvement in the printing properties of the ink is effected so that the improved inks print satisfactorily from half-tone screens without substantial "specking" or "fill in." Pine oil is a liquid material of commerce derived from pine gum. It has a boiling range (5–95%) from approximately 190° C. to approximately 225° C. and consists principally of borneol, isomers of terpineol and fenchyl alcohol together with smaller proportions of terpene hydrocarbons. It is usually obtained in the manufacture of gum or wood rosin. As supplied commercially, pine oil is a clear, colorless to faint yellow oily liquid which is soluble in a wide range of organic solvents, but insoluble in water. It has a characteristic pungent odor.

As an equivalent of pine oil, we have found that mono-terpinyl ethylene glycol ether is satisfactory. This compound is likewise a well known article of commerce, easily obtainable and having characteristics somewhat similar to those of pine oil and particularly in respect to its effect when used in ink compositions.

The proportion of pine oil or its equivalent in the ink can vary between relatively wide limits. A sufficient amount must be used to produce the desirable cleanliness of printing, but on the other hand the amount should not be so large as to interfere seriously with the speed of steam drying. Pine oil, being insoluble in water, has a tendency to prevent the introduction of moisture into the printed film when used in large amounts. A satisfactory guide in the amount of pine oil or its equivalent to be used is approximately 1 part for each 3 parts of liquid polyglycol. From 7% to 15% by weight of pine oil or its equivalent based on the total weight of the ink formulation will ordinarily assure excellent results, although variations beyond this range may be desirable in certain instances due to the composition of a particular ink.

The details of the invention are illustrated more completely by the following examples, it being understood that these are merely illustrative, since ink formulations vary widely depending upon color, the nature of the pigment used, the resins and solvents used and other conditions.

Example I

A sodium rosinate varnish was made as follows:

| | Parts |
|---|---|
| Wood rosin, acid number—120.6 | 55.5 |
| Diethylene glycol | 37.3 |

Heat to 350° F. and hold until resin is dissolved. Cool to 150° F. Add:

| | Parts |
|---|---|
| 50% sodium hydroxide (aqueous) | 7.2 |

Stir until reaction is complete. This varnish was miscible with water.

An ink was made according to the following formula:

| | Parts |
|---|---|
| Milori blue | 3.00 |
| Carbon black | 14.00 |
| Calcium carbonate | 8.00 |
| Varnish as prepared above | 46.40 |
| Diethylene glycol | 17.12 |
| Pine oil | 11.48 |
| | 100.00 |

Example II

The resin used was a rosin modified with an alpha beta unsaturated dibasic organic acid as described in the patent to Carleton Ellis No. 2,063,542. This resin is known in the trade as "Teglac 127." The ink formulation was as follows:

| | Parts |
|---|---|
| Milori blue | 3.0 |
| Carbon black | 14.0 |
| Calcium carbonate | 8.0 |
| Teglac 127 | 28.6 |
| Diethylene glycol | 35.6 |
| Pine oil | 10.8 |
| | 100.0 |

Example III

A urea-formaldehyde varnish was made by taking a resin prepared by condensing urea with formaldehyde in water and interchanging solvents by vacuum distillation until the water was replaced with diethylene glycol. The varnish was soluble in water. The formulation was as follows:

| | Parts |
|---|---|
| Milori blue | 2.86 |
| Carbon black | 13.30 |
| Calcium carbonate | 7.64 |
| Urea-formaldehyde resin | 19.64 |
| Diethylene glycol | 46.10 |
| Pine oil | 10.30 |
| 50% sodium hydroxide (aqueous) | 0.16 |
| | 100.00 |

Example IV

A varnish containing triethanolammonium rosinate, the rosin salt of triethanolamine, was made as follows:

| | Parts |
|---|---|
| Wood rosin, acid number—120.6 | 52.3 |
| Triethanolamine | 12.5 |
| Diethylene glycol | 35.2 |

Heat to 300°–320° F., hold till solution is clear, then cool. This varnish is miscible with water.

An ink was made from this varnish and had the following formula:

| | Parts |
|---|---|
| Milori blue | 3.00 |
| Carbon black | 14.00 |
| Calcium carbonate | 8.00 |
| Varnish prepared above | 51.40 |
| Diethylene glycol | 12.10 |
| Pine oil | 11.50 |
| | 100.00 |

Following are two examples of inks including monoterpinyl ethylene glycol ether as the equivalent of pine oil:

Example V

| | Parts |
|---|---|
| Milori blue | 3.00 |
| Carbon black | 14.00 |
| Calcium carbonate | 8.00 |
| Teglac 127 | 28.50 |
| Diethylene glycol | 35.00 |
| Mono-terpinyl ethylene glycol ether | 11.50 |
| | 100.00 |

Example VI

| | Parts |
|---|---|
| Milori blue | 3.00 |
| Carbon black | 14.00 |
| Calcium carbonate | 8.00 |
| Urea-formaldehyde resin | 18.30 |
| Diethylene glycol | 45.04 |
| Mono-terpinyl ethylene glycol ether | 11.50 |
| 50% sodium hydroxide (aqueous) | 0.16 |
| | 100.00 |

The foregoing examples are black inks. The invention is equally applicable to the production of colored inks of great variety. Any of the usual coloring materials may be employed in accordance with the standard practice of ink formulation. The following examples will suffice to indicate typical formulations employing pine oil, it being understood that mono-terpinyl ethylene glycol ether may be substituted therefor.

Example VII

| | Parts |
|---|---|
| Milori blue | 50.0 |
| Varnish of Example I | 30.0 |
| Diethylene glycol | 8.6 |
| Pine oil | 11.4 |
| | 100.00 |

Example VIII

| | Parts |
|---|---|
| Phthalocyanine blue | 38.4 |
| Varnish of Example I | 46.2 |
| Diethylene glycol | 6.6 |
| Pine oil | 8.8 |
| | 100.00 |

Example IX

| | Parts |
|---|---|
| Chrome yellow | 50.0 |
| Varnish of Example I | 30.0 |
| Diethylene glycol | 8.6 |
| Pine oil | 11.4 |
| | 100.00 |

Example X

| | Parts |
|---|---|
| Lake red C | 25.00 |
| Varnish of Example I | 46.40 |
| Diethylene glycol | 17.12 |
| Pine oil | 11.48 |
| | 100.00 |

The inks as described behave with respect to dust, lint, fibers and pigment similarly to the older types of linseed oil inks, that is to say, the extraneous material, instead of collecting on the half-tone plates, is carried back to the ink fountain. "Specking" and "fill-in" are substantially avoided even after long printing runs, permitting satisfactory impressions with the minimum of lost paper and wash-up time.

Various changes may be made in the details of the formulations without departing from the invention or sacrificing the advantages thereof.

We claim:

1. A printing ink comprising a suspension of pigment in a vehicle consisting of a resin dissolved in a liquid polyglycol and a proportion of a liquid selected from the class consisting of pine oil and mono-terpinyl ethylene glycol ether effective to prevent "fill-in" in half-tone plates but insufficient to substantially interfere with the speed of steam-drying of said ink.

2. A printing ink comprising a suspension of pigment in a vehicle consisting of a resin dissolved in a liquid polyglycol and a proportion of pine oil effective to prevent "fill-in" in half-tone plates but insufficient to substantially interfere with the speed of steam-drying of said ink.

3. A printing ink comprising a suspension of pigment in a vehicle consisting of a resin dissolved in a liquid polyglycol and a proportion of mono-terpinyl ethylene glycol ether effective to prevent "fill-in" in half-tone plates but insufficient to substantially interfere with the speed of steam-drying of said ink.

4. A printing ink comprising a suspension of pigment in a vehicle consisting of a resin dissolved in a liquid polyglycol and approximately 7% to 15% by weight based on the total weight of the ink of a liquid selected from the class consisting of pin oil and mono-terpinyl ethylene glycol ether to prevent "fill-in" in half-tone plates.

5. A printing ink comprising a suspension of pigment in a vehicle consisting of a resin dissolved in a liquid polyglycol and approximately 7% to 15% by weight based on the total weight of the ink of pine oil.

6. A printing ink comprising a suspension of pigment in a vehicle consisting of a resin dissolved in a liquid polyglycol and approximately 7% to 15% by weight based on the total weight of the ink of monoterpinyl ethylene glycol ether.

JOHN W. KROEGER.
DANIEL J. O'CONNOR, JR.